United States Patent
Kerstetter et al.

(10) Patent No.: US 12,086,425 B2
(45) Date of Patent: Sep. 10, 2024

(54) TECHNIQUES FOR NON-VOLATILE DATA PROTECTION

(71) Applicant: Micron Technology, Inc., Boise, ID (US)

(72) Inventors: Bryan David Kerstetter, Kuna, ID (US); Donald Martin Morgan, Meridian, ID (US); Alan J. Wilson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 79 days.

(21) Appl. No.: 17/730,755

(22) Filed: Apr. 27, 2022

(65) Prior Publication Data
US 2023/0350580 A1    Nov. 2, 2023

(51) Int. Cl.
*G06F 3/06* (2006.01)

(52) U.S. Cl.
CPC .......... *G06F 3/0622* (2013.01); *G06F 3/0604* (2013.01); *G06F 3/0652* (2013.01); *G06F 3/0659* (2013.01); *G06F 3/0679* (2013.01)

(58) Field of Classification Search
CPC .... G06F 3/0622; G06F 3/0604; G06F 3/0652; G06F 3/0659; G06F 3/0679
See application file for complete search history.

(56) References Cited

U.S. PATENT DOCUMENTS

| | | | | |
|---|---|---|---|---|
| 7,123,435 B1* | 10/2006 | Schreck | ............ | G11B 5/59661 360/75 |
| 2005/0005131 A1* | 1/2005 | Yoshida | ................... | G06F 21/31 713/183 |
| 2009/0172251 A1* | 7/2009 | Norman | .................... | G11C 8/20 703/23 |
| 2011/0314296 A1* | 12/2011 | Dolgunov | ............... | G06F 21/34 713/185 |
| 2012/0278579 A1* | 11/2012 | Goss | ................... | G06F 12/0246 711/E12.002 |
| 2015/0121537 A1* | 4/2015 | Ellis | ........................ | G06F 21/60 726/26 |
| 2015/0127946 A1* | 5/2015 | Miller | ................... | H04L 9/0897 713/171 |

* cited by examiner

*Primary Examiner* — Gurtej Bansal
(74) *Attorney, Agent, or Firm* — Holland & Hart LLP

(57) ABSTRACT

Methods, systems, and devices for techniques for non-volatile data protection are described. As part of a power on operation, a non-volatile memory system may be configured to selectively stored data. For example, the memory system may determine whether a host system is authorized to access data stored in the memory system prior to a power off operation. If the memory system determines that the host system is authorized, the memory device may retain the data. If the memory system determines that the host system is not authorized, the memory system may erase all or a portion of the data. In some cases, the memory system may maintain a retain flag to determine whether the host system is authorized. Additionally or alternatively, the memory system may determine whether a password received from the host system is valid to determine whether the host system is authorized.

25 Claims, 8 Drawing Sheets

TECHNIQUES FOR NON-VOLATILE DATA PROTECTION

FIELD OF TECHNOLOGY

The following relates to one or more systems for memory, including techniques for non-volatile data protection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source. Non-volatile devices may have lower densities than volatile memory devices due to larger memory cells. However, non-volatile memory devices may be able to achieve densities similar to volatile memory by decreasing the memory cell size.

DETAILED DESCRIPTION

Some non-volatile memory systems may be used in place of volatile memory systems. For example, a non-volatile memory system, such as a NAND system, an FeRAM system, a PCM system, a ROM system, a three-dimensional NAND system, or other memory system which include non-volatile memory cells, may be configured to receive and perform commands associated with a volatile memory system, such as a DRAM system. Because non-volatile memory systems may retain stored data upon removing power, a computing system which uses a non-volatile memory system in place of a volatile memory system may allow for reduced power consumption, for example by allowing the non-volatile memory system to power down during idle periods of the computing system. Additionally, using a non-volatile memory system in place of a volatile memory system may increase the speed of system wakeup time. However, using a non-volatile memory system in place of a volatile memory system may introduce security risks in the computing system. For example, a malicious actor may remove the non-volatile memory system during operation, and may pair the non-volatile memory system with an unauthorized host system to extract sensitive or secret data. Accordingly, techniques to protect data stored in a non-volatile memory system from unauthorized access are desired.

As described herein, as part of a power on operation, a memory system may be configured to selectively erase all or a portion of stored data to protect the data from unauthorized access. For example, the memory system may determine whether the host system is authorized to access data which was stored in the memory system prior to a power off operation. If the memory system determines that the host system is authorized to access the data, the memory system may retain the data. Accordingly, the memory system may receive and perform one or more commands from the host system to access the data. If the memory system determines that the host system is not authorized to access the data, the memory system may erase all or a portion of the data. In some cases, the memory system may maintain a retain flag to determine whether the host system is authorized to access the data. Additionally or alternatively, the host system may transmit a password to the memory system as part of the power on operation, and the memory system may determine whether the password is valid to determine whether the host system is authorized to access the data.

Features of the disclosure are initially described in the context of systems and dies as described with reference to FIGS. 1 and 2. Features of the disclosure are described in the context process flows and a system as described with reference to FIGS. 3-5. These and other features of the disclosure are further illustrated by and described with reference to an apparatus diagram and flowcharts that relate to techniques for non-volatile data protection as described with reference to FIGS. 6-8.

Figure 1:
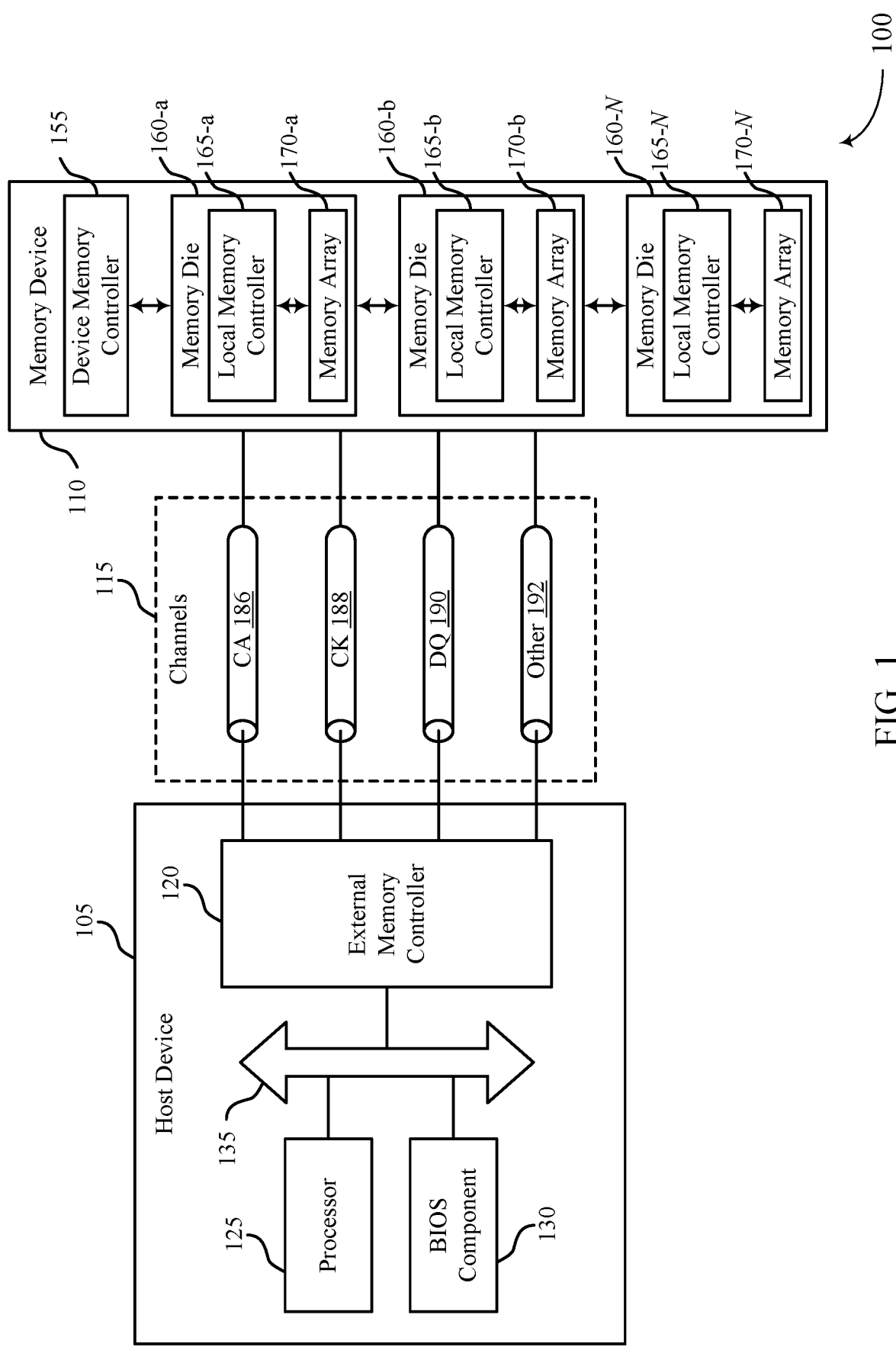
FIG. 1 illustrates an example of a system that supports techniques for non-volatile data protection in accordance with examples as disclosed herein.

FIG. 1 illustrates an example of a system 100 that supports techniques for non-volatile data protection in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive information (e.g., data, commands, or both) from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some cases, as part of a power on operation, a memory device 110 may be configured to selectively erase all or a portion of stored data (e.g., data stored in one or more non-volatile memory dies 160) to protect the data from unauthorized access. For example, the memory device 110 may determine whether a host system 105 is authorized to access data which was stored in the memory device 110 prior to a power off operation. If the memory device 110 determines that the host system 105 is authorized to access the data, the memory device 110 may retain the data. If the memory device 110 determines that the host system 105 is not authorized to access the data, the memory device 110 may erase all or a portion of the data. In some cases, the memory device 110 may maintain a retain flag to determine whether the host system 105 is authorized to access the data. Additionally or alternatively, the host system 105 may transmit a password to the memory device 110 as part of the power on operation, and the memory device 110 may determine whether the password is valid to determine whether the host system 105 is authorized to access the data.

Figure 2:
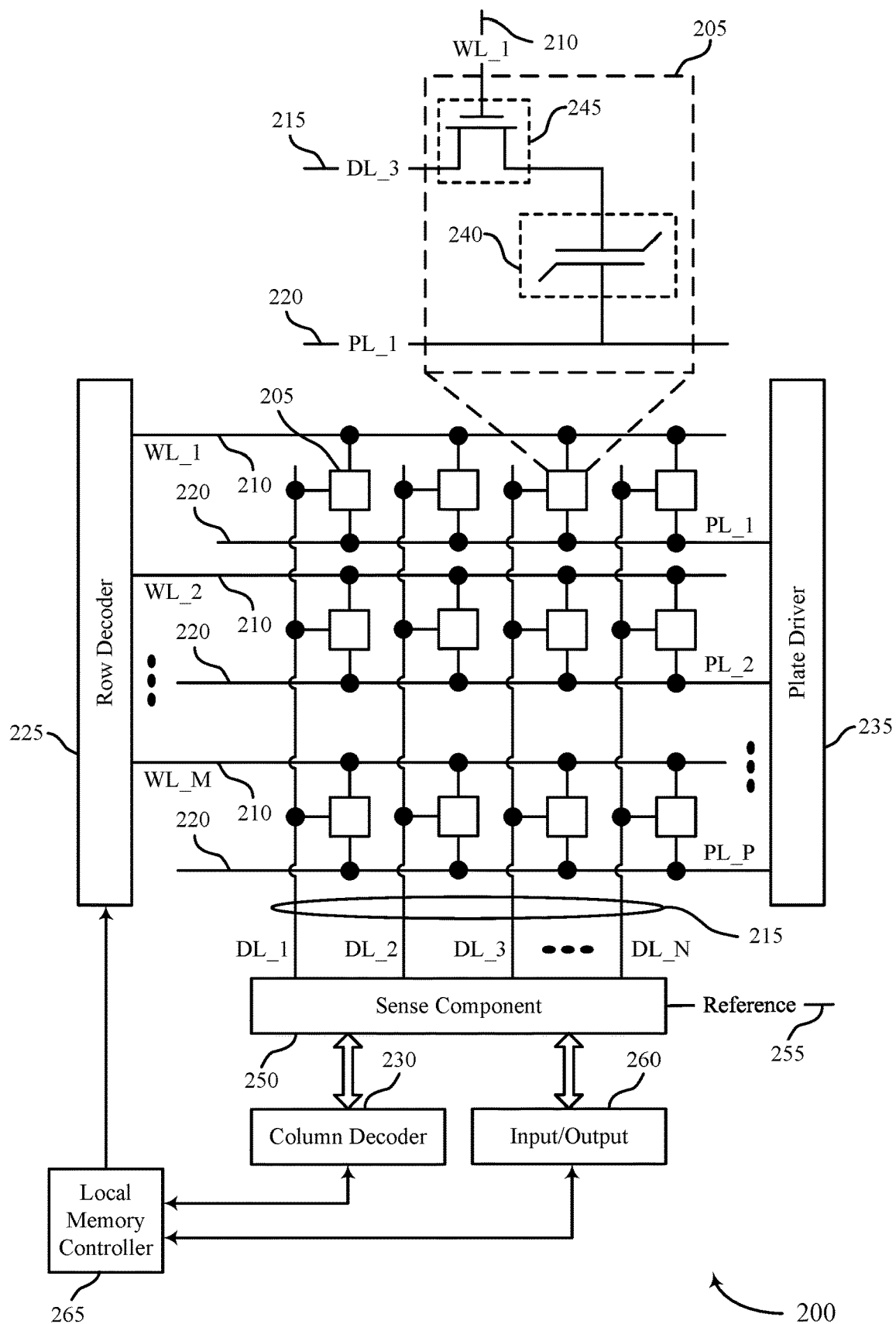
FIG. 2 illustrates an example of a memory die that supports techniques for non-volatile data protection in accordance with examples as disclosed herein.

FIG. 2 illustrates an example of a memory die 200 that supports techniques for non-volatile data protection in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a state (e.g., polarization state or dielectric charge) representative of the programmable states in a capacitor. In FeRAM architectures, the memory cell 205 may include a capacitor 240 that includes a ferroelectric material to store a charge and/or a polarization representative of the programmable state. The memory cell 205 may include a logic storage component, such as capacitor 240, and a switching component 245 (e.g., a cell selection component). The capacitor 240 may be an example of a ferroelectric capacitor. A first node of the capacitor 240 may be coupled with the switching component 245 and a second node of the capacitor 240 may be coupled with a plate line 220. The switching component 245 may be an example of a transistor or any other type of switch device that selectively establishes or de-establishes electronic communication between two components.

The memory die 200 may include access lines (e.g., word lines 210, digit lines 215, and plate lines 220) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, bit lines, or plate lines, or their analogues, are interchangeable without loss of understanding. Memory cells 205 may be positioned at intersections of the word lines 210, the digit lines 215, and/or the plate lines 220.

Operations such as reading and writing may be performed on memory cells 205 by activating access lines such as a word line 210, a digit line 215, or a plate line 220. By biasing a word line 210, a digit line 215, and a plate line 220 (e.g., applying a voltage to the word line 210, digit line 215, or plate line 220), a single memory cell 205 may be accessed at their intersection. The intersection of a word line 210 and a digit line 215 in a two-dimensional or in a three-dimensional configuration may be referred to as an address of a memory cell 205. Activating a word line 210, a digit line 215, or a plate line 220 may include applying a voltage to the respective line.

Accessing the memory cells 205 may be controlled through a row decoder 225, a column decoder 230, or a plate driver 235, or a combination thereof. For example, a row decoder 225 may receive a row address from the local memory controller 265 and activate a word line 210 based on the received row address. A column decoder 230 receives a column address from the local memory controller 265 and activates a digit line 215 based on the received column address. A plate driver 235 may receive a plate address from the local memory controller 265 and activates a plate line 220 based on the received plate address.

Selecting or deselecting the memory cell 205 may be accomplished by activating or deactivating the switching component 245. The capacitor 240 may be in electronic communication with the digit line 215 using the switching component 245. For example, the capacitor 240 may be isolated from digit line 215 when the switching component 245 is deactivated, and the capacitor 240 may be coupled with digit line 215 when the switching component 245 is activated.

The sense component 250 may determine a state (e.g., a polarization state or a charge) stored on the capacitor 240 of the memory cell 205 and determine a logic state of the memory cell 205 based on the detected state. The sense component 250 may include one or more sense amplifiers to amplify the signal output of the memory cell 205. The sense component 250 may compare the signal received from the memory cell 205 across the digit line 215 to a reference 255 (e.g., a reference voltage). The detected logic state of the memory cell 205 may be provided as an output of the sense component 250 (e.g., to an input/output 260), and may indicate the detected logic state to another component of a memory device (e.g., a memory device 110) that includes the memory die 200.

The local memory controller 265 may control the operation of memory cells 205 through the various components (e.g., row decoder 225, column decoder 230, plate driver 235, and sense component 250). The local memory controller 265 may be an example of the local memory controller 165 described with reference to FIG. 1. In some examples, one or more of the row decoder 225, column decoder 230, and plate driver 235, and sense component 250 may be co-located with the local memory controller 265. The local memory controller 265 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 265 may generate row signals and column address signals to activate the target word line 210, the target digit line 215, and the target plate line 220. The local memory controller 265 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 265 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 265 in response to various access commands (e.g., from a host device 105). The local memory controller 265 may be operable to perform other access operations not listed here or other operations related to the operating of the memory die 200 that are not directly related to accessing the memory cells 205.

In some cases, as part of a power on operation, a memory device which includes the memory die 200 may be configured to selectively erase all or a portion of stored data (e.g., data stored in one or more non-volatile memory cells 205) to protect the data from unauthorized access. For example, the memory device may determine whether a host system is authorized to access data which was stored in the memory device prior to a power off operation. If the memory device determines that the host system is authorized to access the data, the memory device may retain the data. If the memory device determines that the host system is not authorized to access the data, the memory device may erase all or a portion of the data. In some cases, the memory device may maintain a retain flag to determine whether the host system is authorized to access the data. Additionally or alternatively, the host system may transmit a password to the memory device as part of the power on operation, and the memory device may determine whether the password is valid to determine whether the host system is authorized to access the data.

Figure 3:
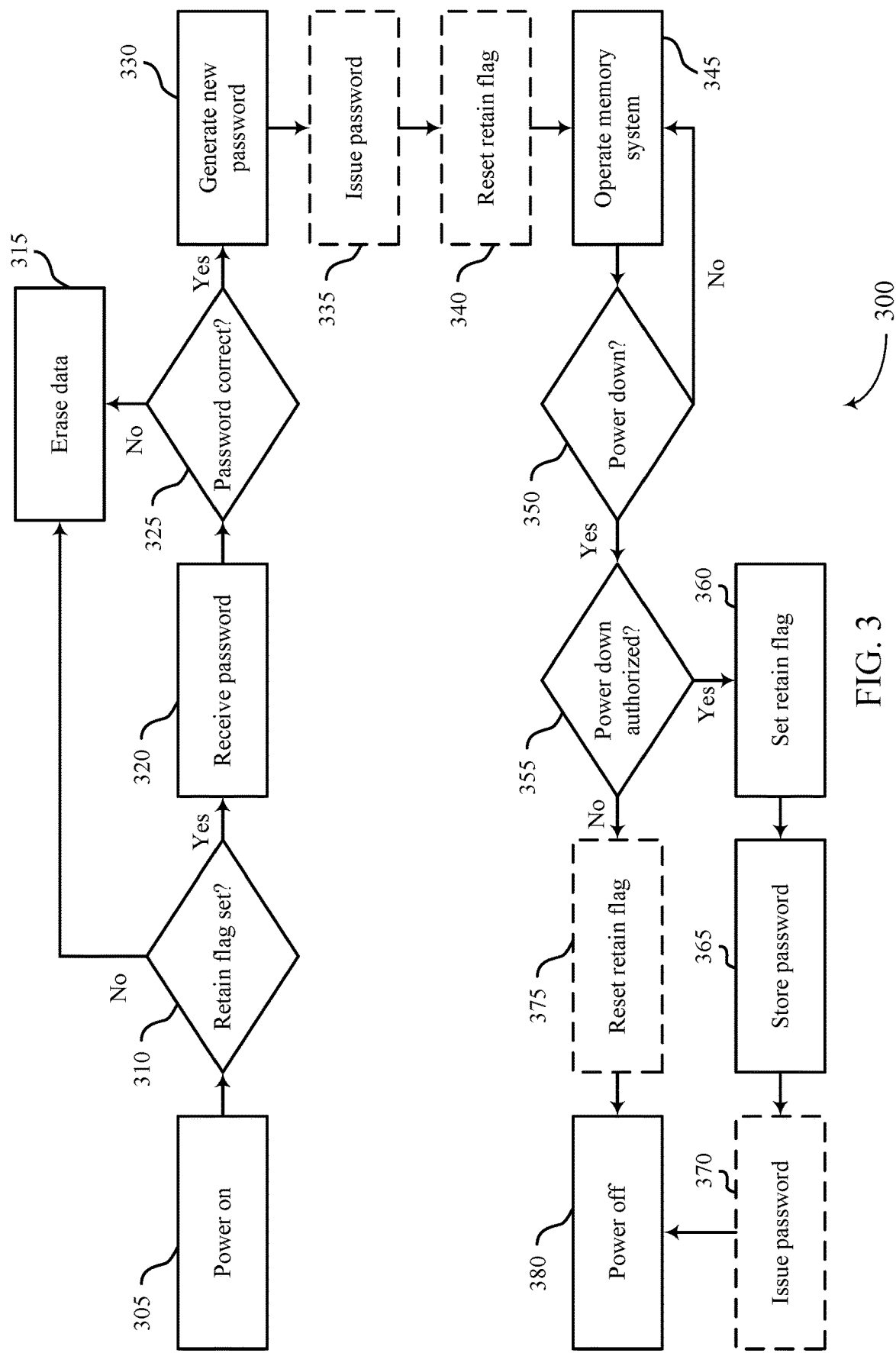
FIG. 3 illustrates an example of a process flow that supports techniques for non-volatile data protection in accordance with examples as disclosed herein.

FIG. 3 illustrates an example of a process flow 300 that supports techniques for non-volatile data protection in accordance with examples as disclosed herein. The process flow 300 may be implemented by a memory system, which may be examples of the corresponding system as described with reference to FIGS. 1 and 2. In the following description of process flow 300, the operations may be performed in a different order than the order shown. For example, specific operations may also be left out of process flow 300, or other operations may be added to process flow 300.

The process flow 300 may illustrate an example of a data retention protocol performed by the memory system, in response to commands received from a host system. The memory system may be an example of a non-volatile memory system, such as a NAND system, an FeRAM system, a PCM system, or another type of system which includes non-volatile memory cells. In some cases, the host system may use the memory system in place of a volatile memory system, such as DRAM. Accordingly, the memory system may retain data after power is removed from the memory system, which may introduce a security risk for the host system and the memory system. Thus, the memory system may be configured to erase all or portion of stored data upon powering on to protect the data from unauthorized access. For example, as part of a power on operation, the memory system may determine whether the host system is authorized to access data which was stored in the memory system prior to a power off operation. If the memory system determines that the host system is authorized to access the data, the memory system may retain the data. Accordingly, the memory system may receive and perform one or more commands from the host system to access the data. Additionally or alternatively, if the memory system determine that the host system is not authorized to access the data, the memory system may erase all or a portion of the data. In some cases, the memory system may be configured to receive and perform one or more commands from the host system associated with second data (e.g., data written from the host system subsequent to the power on operation).

In some cases, the memory system may use a value of a retain flag to determine whether the host system is authorized to access data which was stored in the memory system prior to a power off operation. For example, if a host system is authorized to access the data, the memory system may set the retain flag (e.g., may assign a first logical value, such as "1" or a "true" value to the retain flag) as part of a power off operation. Upon power on, the memory system may check the value of the retain flag. If the retain flag has been set (e.g., if the value of the retain flag is the first logical value), the memory system may retain stored data. Alternatively, if the retain flag has not been set (e.g., if the value of the retain flag is a second logical value, such as a "0" or "false" value), the memory system may erase all or a portion of the stored data. After checking the value of the retain flag, the memory system may reset the retain flag, for example by assigning the second logical value to the retain flag. In some cases, the memory system may reset the retain flag as part of the power on operation. Additionally or alternatively, the memory system may reset the retain flag as part of a power off operation, such as if the memory system determines that a power off operation is not authorized.

Additionally or alternatively, the memory system may use a password received from the host system to determine whether the host system is authorized to access data which was stored in the memory system prior to a power off operation. For example, if the host system is authorized to access the data, the memory system may generate and issue a password, such as a one-time password (OTP) to the host system as part of a power off operation. Upon power on, the host system may transmit the password to the memory system, and the memory system may determine whether the password received from the host system matches a stored password. If the received password matches the stored password, the memory system may retain the stored data. Alternatively, if the received password does not match the stored password, the memory system may erase all or a portion of the stored data. After comparing the stored password with the received password, the memory system may generate a new password and store the new password in a non-volatile register (e.g., such that the new password is retained upon power off). In some cases, the memory system may transmit the new password to the host system as part of the power on operation. Additionally or alternatively, the memory system may transmit the new password to the host system as part of the power off operation, such as if the memory system determines that the power off operation is authorized. In some cases, the memory system may use both the retain flag and the OTP to determine whether to retain the stored data. Alternatively, the memory system may use the retain flag without using the OTP to determine whether to retain the stored data, or the memory system may use the OTP without using the retain flag to determine whether to retain the stored data.

By way of example, at 305, the memory system may be powered on. Upon detecting the power on condition, the memory system may initiate a power on operation. As part of the power on operation, the memory system may determine whether to retain data stored prior to the power on (e.g., data stored as part of a previous power cycle).

In some cases, at 310, the memory system may determine whether the retain flag has been set. For example, the memory system may read a value of a first non-volatile register storing the retain flag. If the value of the first register corresponds to the second logical value (e.g., a logical "0"

or "false" value), the memory system may determine that the host system is not authorized access the data. Accordingly, the memory system may, at 315, erase all or a portion of the data. If the value of the first register corresponds to the first logical value (e.g., a logical "1" or "true" value), the memory system may determine that the host system is authorized to access the stored data. For example, the process flow 300 may proceed to 345, and the memory system may receive and perform commands associated with second data from the host system.

In some cases, at 320, the host system may transmit, and the memory system may receive, a first password. At 325, the memory system may determine whether the first password is valid. For example, the memory system may compare the first password to a second password stored in a second non-volatile register of the memory device. If the first password matches the second password, the memory system may determine that the first password is valid, and thus may determine that the host system is authorized to access the data. If the first password does not match the second password, the memory system may determine that the host system is not authorized to access the data, and accordingly, the memory system may, at 315, erase all or a portion of the data.

In some cases, the memory system may not receive the first password at 320. For example, if the host system is not part of an authorized device, the host system may not have a password, and accordingly may not transmit the first password to the memory system. Thus, as part of the power on procedure, the memory system may wait for a threshold duration of time to receive the first password. If the first password is not received within the duration of time, the memory system may determine that the host system is not authorized to access the data. Accordingly, the memory system may, at 315, erase all or a portion of the data.

Upon determining whether the first password is valid, the memory system may, at 330, generate a new password (e.g., a third password) as part of the power on operation. To generate the new password, the memory system may generate a random (e.g., pseudo-random) number, for example using a random number generator (RNG). In some cases, the new password may be the random number. Additionally or alternatively, the memory system may perform additional processing steps to generate the new password using the random number, such as using the random number as an input to one or more algorithms.

In some cases, the memory system may issue the new password to the host system, may reset the value of the retain flag, or both as part of the power on operation. For example, at 335, the memory system may transmit the new password to the host system, and the host system may store the new password for use in a subsequent power on operation. Additionally or alternatively, the memory system may, at 340, reset the value of the retain flag, for example by storing the second logical value in the first non-volatile register. Accordingly, the process flow 300 may proceed to 345, and the memory system may receive and perform commands associated with second data from the host system.

The process flow 300 may include initiating and performing a power off operation. For example, at 350, the memory system may determine whether to initiate the power off operation in response to receiving a command (e.g., a power off command) from the host system. In some cases, the memory system may, at 355, determine whether the power off is authorized. For example, the command received at 350 may include an indication of whether to retain the second data as part of the power off operation. If the command includes an indication to retain the second data, the memory system may, at 360 set the retain flag, for example by storing the first logical value in the first non-volatile register. Additionally or alternatively, the memory system may, at 365, store the new password generated at 330 in the second non-volatile register.

In some cases, the memory system may issue the new password to the host system as part of the power off operation. For example, at 370, the memory system may transmit the new password to the host system, and the host system may store the new password for use in a subsequent power on operation. Accordingly, the memory system may, at 380, power off, for example by removing or deactivating one or more power supplies from the host system.

In some cases, if the command does not include the indication to retain the second data, the memory system may, at 375 and as part of the power off operation, reset the value of the retain flag, for example by storing the second logical value in the first non-volatile register. Additionally or alternatively, the memory system may, at 355, determine that the host system is not authorized to retain the second data. Accordingly, the memory system may, at 380, power off, for example by removing or deactivating one or more power supplies.

Aspects of the process flow 300 may be implemented by a controller, among other components. Additionally or alternatively, aspects of the process flow 300 may be implemented as instructions stored in memory (e.g., firmware stored in a memory coupled with the host system or the memory system). For example, the instructions, when executed by a controller, may cause the controller to perform the operations of the process flow 300.

Figure 4:
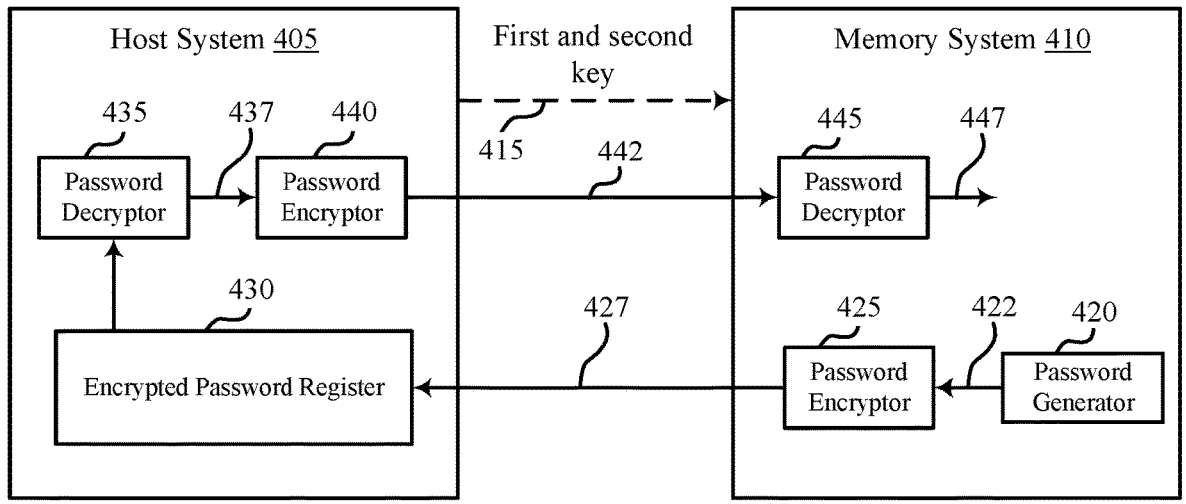
FIG. 4 illustrates an example of a system that supports techniques for non-volatile data protection in accordance with examples as disclosed herein.

FIG. 4 illustrates an example of a system 400 that supports techniques for non-volatile data protection in accordance with examples as disclosed herein. The system 400 may include a host system 405 and a memory system 410 configured to perform aspects of the process flow 300. The host system 405 and the memory system 410 may be examples of the corresponding devices as described with reference to FIGS. 1 through 3. The host system 405 may include a host system controller, and the memory system 410 may include a memory system controller, which may each be configured to control or perform aspects or operations associated with access operations or other functions of the host system 405 and the memory system 410.

The host system 405 and the memory system 410 may use one or more pairs of encryption keys to encrypt data or control information transmitted between the host system 405 and the memory system 410. For example, the host system 405 and the memory system 410 may use a first pair of keys to encrypt and decrypt a password transmitted from the host system 405 to the memory system 410, and may use a second pair of keys to encrypt and decrypt a second password transmitted from the memory system 410 to the host system 405.

The first pair of keys and the second pair of keys may each be examples of a symmetric key pair or an asymmetric key pair. For example, a first key and a second key of a key pair may be identical (e.g., the key pair may be symmetric), or the first key and the second key may be examples of a public and private key pair (e.g., the key pair may be asymmetric). In some cases, the host system 405 and the memory system 410 may share the first and second key pairs 415. For example, the host system 405 may generate and transmit a first key corresponding to the first key pair and a second key corresponding to the second key pair to the memory system 410. The memory system may store the first key and the second key in non-volatile registers of the memory system 410. Additionally, the host system 405 may store a third key corresponding to the first key (e.g., the additional key of the first key pair) and a fourth key corresponding to the second key (e.g., the additional key of the second key pair). In some cases, the memory system 410 may generate and transmit the first key pair and the second key pair 415. In some cases, the host system 405 and the memory system 410 may exchange the first and second key pairs 415 as part of an initial pairing operation (e.g., as part of manufacturing the host system 405, the memory system 410, or both). Accordingly, the host system 405, the memory system 410, or both may not output the first key pair or the second key pair after the initial pairing operation.

By way of example, the memory system 410 may include password generator 420 that may generate a private password 422, such as the OTP described with reference to FIG. 3 (e.g., at step 330 of process flow 300). Subsequently, a password encryptor 425 of the memory system 410 may encrypt the password 422 using the second key of the second key pair to obtain an encrypted password 427. In some cases, to encrypt the password, the password encryptor 425 may perform an encryption scheme using the second key and the password. Accordingly, the memory system 410) may transmit the encrypted password 427 to the host system 405. The host system 405 may store the encrypted password in an encrypted password register 430) for use in a subsequent power on operation. In some cases, the host system 405 may include password decryptor 435 that may decrypt the encrypted password 427, for example by performing a decryption scheme associated with the encryption scheme performed by the memory system 410 using the fourth key of the second key pair. Thus, the host system may obtain a representation of the password 437.

In some cases, as part of a power on operation for the memory system 410 (e.g., the power on operation as described at step 305 of process flow 300), the host system 405 may encrypt the password decrypted at 435 using password encryptor 440. To encrypt the password, the password encryptor 440 may perform an encryption scheme using the third key of the first key pair and the password. Accordingly, the host system 405 may transmit the encrypted password 442 to the memory system 410. The memory system 410 may include password decryptor 445 that may decrypt the password, for example by performing a decryption scheme associated with the encryption scheme performed by the password encryptor 440 of the host system 405 using the first key of the first key pair. In some cases, the memory system 410 may compare the received decrypted password 447 to the password 422 to determine whether the host system 405 is authorized to access data retained by the memory system 410 (e.g., as described in step 325 of process flow: 300).

Figure 5:
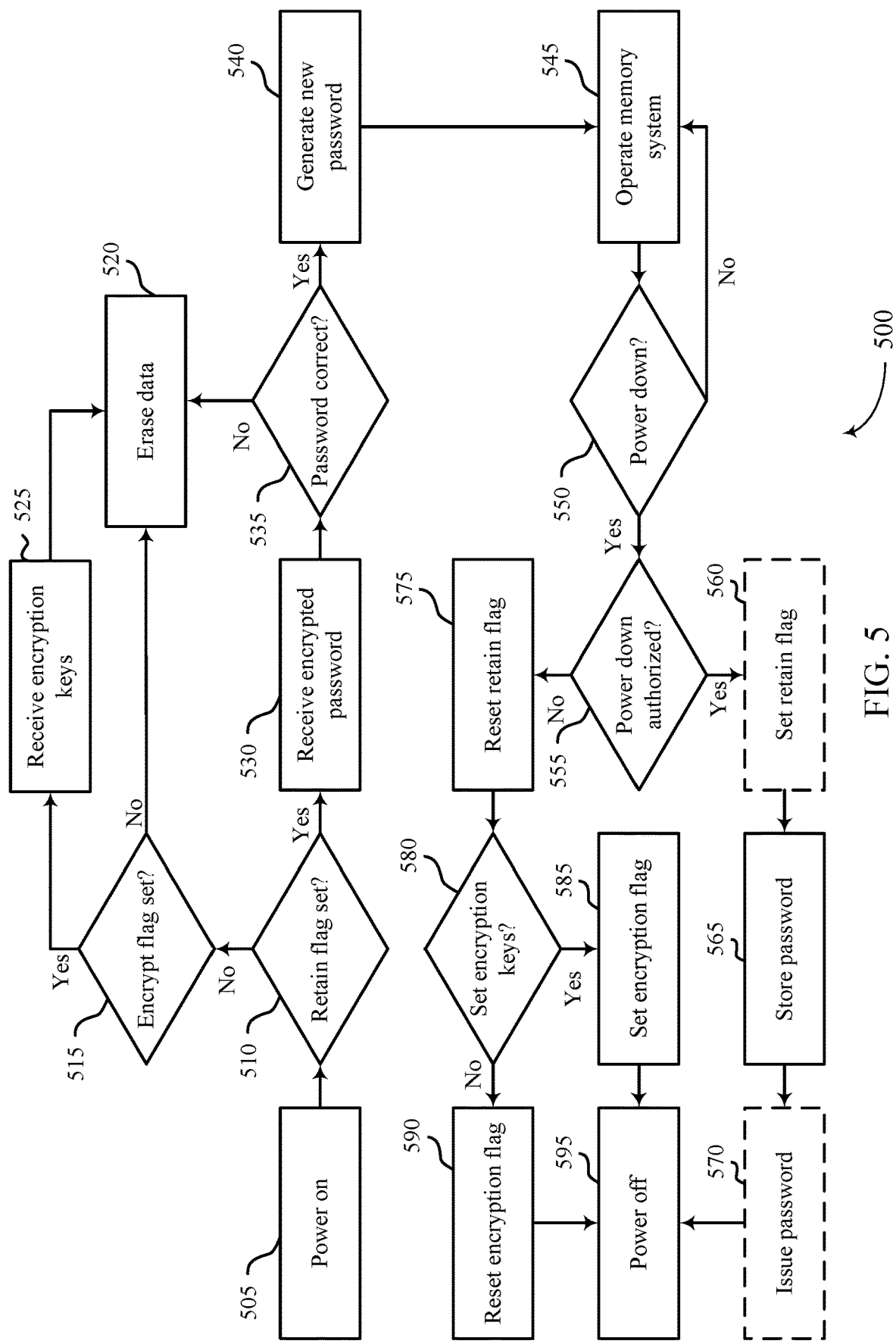
FIG. 5 illustrates an example of a process flow that supports techniques for non-volatile data protection in accordance with examples as disclosed herein.

FIG. 5 illustrates an example of a process flow 500 that supports techniques for non-volatile data protection in accordance with examples as disclosed herein. The process flow: 500 may be implemented by a memory system and a host system, such as the memory system 410 and the host system 405 as described with reference to FIG. 4. In the following description of process flow 500, the operations may be performed in a different order than the order shown. For example, specific operations may also be left out of process flow 500, or other operations may be added to process flow 500.

The process flow: 500 may illustrate an example of a data retention protocol performed by the memory system using one or more pair of encryption keys, such as the first pair of encryption keys and the second pair of encryption keys as described with reference to FIG. 4.

By way of example, at 505, the memory system may be powered on. Upon detecting the power on condition, the memory system may initiate a power on operation. As part of the power on operation, the memory system may determine whether to retain data stored prior to the power on (e.g., data stored as part of a previous power cycle).

In some cases, at 510, the memory system may determine whether the retain flag has been set. For example, the memory system may read a value of a first non-volatile register storing the retain flag. If the value of the first register corresponds to the second logical value (e.g., a logical "0" or "false" value), the memory system may determine that the host system is not authorized to access the data. In some cases, the memory system may determine to authorize the host system to access the data (e.g., as part of a pairing or manufacturing process between the host system and the memory system).

For example, at 515, the memory system may determine whether an encryption flag has been set. That is, the memory system may read a value stored in a second non-volatile register storing the encryption flag. If the value of the encryption flag corresponds to the second logical value (e.g., a logical "0" or "false" value), the memory system may determine not to authorize the host system to access the data, and may, at 320, erase all or a portion of the data. Alternatively, if the value of the encryption flag corresponds to the first logical value (e.g., a logical "1" or "true" value), the memory system may determine to receive encryption keys from the host system. Accordingly, at 525, the memory system may transmit an indication to the host system to generate a new set of encryption key pairs, such as a third encryption key pair and a fourth encryption key pair. In response to the indication, the host system may generate the third key pair and the fourth key pair, and may transmit a key from each of the third key pair and the fourth key pair to the memory system.

In some cases, based on determining at 510 that the retain flag is set, the host system may, at 530, transmit and the memory system may receive a first password. In some cases, as part of communicating the first password, the host system may encrypt the first password and the memory system may decrypt the first password using the first key pair or the third key pair (e.g., as described with reference to FIG. 4). Accordingly, at 535, the memory system may determine whether the first password is valid. For example, the memory system may compare the decrypted first password to a second password stored in a third non-volatile register of the memory device. If the first password matches the second password, the memory system may determine that the first password is valid, and thus may determine that the host system is authorized to access the data. If the first password does not match the second password, the memory system may determine that the host system is not authorized to access the data, and accordingly, the memory system may, at 520, erase all or a portion of the data.

In some cases, the memory system may not receive the first password at 530. For example, if the host system is not part of an authorized device, the host system may not have a password, and accordingly may not transmit the first password to the memory system. Thus, as part of the power on procedure, the memory system may wait for a threshold duration of time to receive the first password. If the first password is not received within the duration of time, the memory system may determine that the host system is not authorized to access the data. Accordingly, the memory system may, at 520, erase all or a portion of the data.

Upon determining whether the first password is valid, the memory system may, at 540, generate a new password (e.g., a third password) as part of the power on operation. To generate the new password, the memory system may generate a random number, for example using a RNG. In some cases, the new password may be the random number. Additionally or alternatively, the memory system may perform additional processing steps to generate the new password using the random number, such as using the random number as an input to one or more algorithms. Accordingly, the process flow 500 may proceed to 545, and the memory system may receive and perform commands associated with second data from the host system.

The process flow 500 may include initiating and performing a power off operation. For example, at 550, the memory system may determine whether to initiate the power off operation in response to receiving a command (e.g., a power off command) from the host system. In some cases, the memory system may, at 555, determine whether the power off is authorized. For example, the command received at 550 may include an indication of whether to retain the second data as part of the power off operation. If the command includes an indication to retain the second data, the memory system may, at 560 set the retain flag, for example by storing the first logical value in the first non-volatile register. Additionally or alternatively, the memory system may, at 565, store the new password generated at 540 in the third non-volatile register.

In some cases, the memory system may issue the new password to the host system as part of the power off operation. As part of communicating the new password, the memory system may encrypt the new password and the host system may decrypt the new password using the second key pair or the fourth key pair (e.g., as described with reference to FIG. 4). Accordingly, at 570, the memory system may transmit the encrypted new password to the host system, and the host system may decrypt and store the new password for use in a subsequent power on operation. Accordingly, the memory system may, at 595, power off, for example by removing or deactivating one or more power supplies.

In some cases, if the command does not include the indication to retain the second data, the memory system may, at 575 and as part of the power off operation, reset the value of the retain flag, for example by storing the second logical value in the first non-volatile register. Additionally or alternatively, the memory system may, at 355, determine that the host system is not authorized to retain the second data. Accordingly, the memory system may, at 595, power off, for example by removing or deactivating one or more power supplies.

In some cases, the memory system may, at 580, determine whether to set the encryption keys. For example, the host system may determine to pair with the memory system (e.g., as part of an initial pairing operation or manufacturing operation), or the host system may determine to refresh to encryption key pairs. Accordingly, the host system may transmit an indication to the memory system, for example as part of the power down command or in response to a separate command, to set the encryption keys. If the memory system determines to set the encryption keys, the memory system may, at 585, set the encryption flag, for example by storing the first logical value in the second register. Alternatively, if the memory system does not determine to set the encryption keys, the memory system may, at 590, reset the encryption flag, for example by storing the second logical value in the second register. Accordingly, the memory system may, at 595, power off.

Aspects of the process flow 500 may be implemented by a controller, among other components. Additionally or alternatively, aspects of the process flow 500 may be implemented as instructions stored in memory (e.g., firmware stored in a memory coupled with the host system or the memory system). For example, the instructions, when executed by a controller, may cause the controller to perform the operations of the process flow 500.

Figure 6:
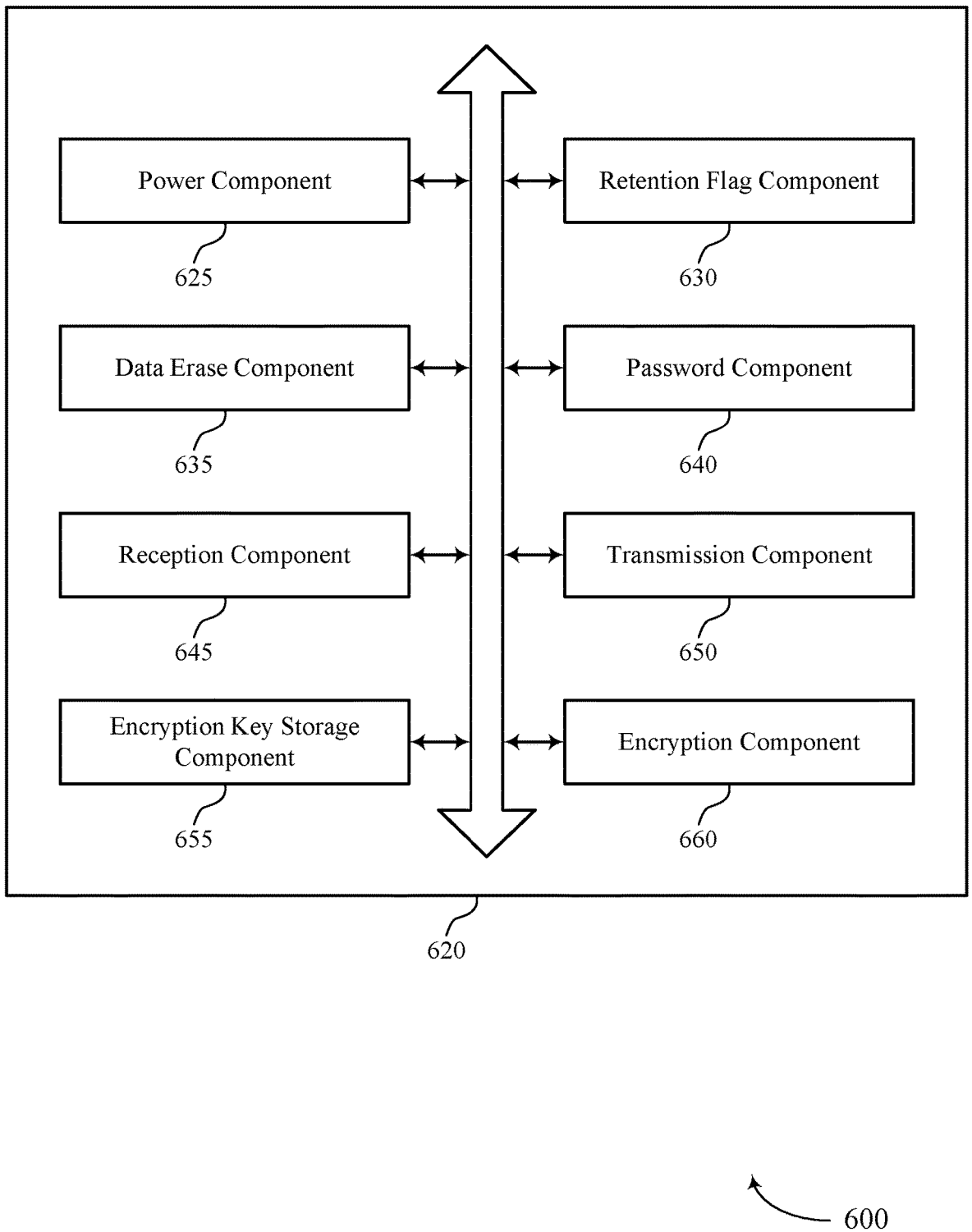
FIG. 6 shows a block diagram of a memory system that supports techniques for non-volatile data protection in accordance with examples as disclosed herein.

FIG. 6 shows a block diagram 600 of a memory system 620 that supports techniques for non-volatile data protection in accordance with examples as disclosed herein. The memory system 620 may be an example of aspects of a memory system as described with reference to FIGS. 1 through 5. The memory system 620, or various components thereof, may be an example of means for performing various aspects of techniques for non-volatile data protection as described herein. For example, the memory system 620 may include a power component 625, a retention flag component 630, a data erase component 635, a password component 640, a reception component 645, a transmission component 650, an encryption key storage component 655, an encryption component 660, or any combination thereof. Each of these components may communicate, directly or indirectly, with one another (e.g., via one or more buses).

The power component 625 may be configured as or otherwise support a means for determining a power on condition of a memory device including non-volatile memory cells. The retention flag component 630 may be configured as or otherwise support a means for determining, subsequent to determining the power on condition of the memory device, whether to retain data stored in the memory device based at least in part on a value of a flag stored in the memory device. The data erase component 635 may be configured as or otherwise support a means for erasing at least a portion of the data based at least in part on determining not to retain the data stored in the memory device.

In some examples, the power component 625 may be configured as or otherwise support a means for initiating a power off operation for the memory device. In some examples, the power component 625 may be configured as or otherwise support a means for determining whether the power off operation is authorized based at least in part on initiating the power off operation.

In some examples, the retention flag component 630 may be configured as or otherwise support a means for setting, prior to completion of the power off operation, the value of the flag stored in the memory device to indicate to not retain second data stored in the memory device based at least in part on determining that the power off operation is not associated with an authorized command to power down.

In some examples, the retention flag component 630 may be configured as or otherwise support a means for setting, prior to completion of the power off operation, the value of the flag stored in the memory device to indicate to retain second data stored in the memory device based at least in part on determining that the power off operation is associated with an authorized command to power down.

In some examples, the reception component 645 may be configured as or otherwise support a means for receiving, from a host device, a command to power down the memory device. In some examples, the power component 625 may be configured as or otherwise support a means for determining whether the host device is authorized to send the command, where determining whether the power off operation is authorized is based at least in part on determining whether the host device is authorized to send the command.

In some examples, the retention flag component 630 may be configured as or otherwise support a means for setting the value of the flag stored in the memory device to indicate not to retain second data stored in the memory device based at least in part on powering on the memory device.

In some examples, setting the value of the flag stored in the memory device to indicate not to retain the second data is performed as part of a power on operation for the memory device.

In some examples, the reception component 645 may be configured as or otherwise support a means for receiving, from a host device, a first password associated with the data based at least in part on determining the power on condition. In some examples, the password component 640 may be configured as or otherwise support a means for determining whether the first password matches a second password associated with authorized access to the data based at least in part on receiving the first password, where erasing at least a portion of the data is based at least in part on determining that the first password does not match the second password.

In some examples, the power component 625 may be configured as or otherwise support a means for determining a power on condition of a memory device including non-volatile memory cells. The password component 640 may be configured as or otherwise support a means for determining, subsequent to the power on condition, whether a valid password associated with access to data stored in the non-volatile memory cells prior to the power on condition is received. In some examples, the data erase component 635 may be configured as or otherwise support a means for erasing at least a portion of the data based at least in part on determining that the valid password is not received.

In some examples, the reception component 645 may be configured as or otherwise support a means for receiving, from a host device, a first password subsequent to determining the power on condition. In some examples, the password component 640 may be configured as or otherwise support a means for determining whether the first password matches the valid password based at least in part on receiving the first password, where erasing at least the portion of the data is based at least in part on determining that the first password does not match the valid password.

In some examples, the reception component 645 may be configured as or otherwise support a means for receiving, from the host device, a first key and a second key, where the first key and the second key are associated with an encryption scheme between the host device and the memory device. In some examples, the encryption key storage component 655 may be configured as or otherwise support a means for storing the first key and the second key in the memory device.

In some examples, the encryption component 660 may be configured as or otherwise support a means for performing a decryption operation on the first password using the first key to generate a decrypted password based at least in part on the encryption scheme, where determining whether the first password matches the valid password is based at least in part on determining whether the decrypted password matches the valid password.

In some examples, the password component 640 may be configured as or otherwise support a means for generating a third password based at least in part determining the power on condition. In some examples, the encryption component 660 may be configured as or otherwise support a means for performing an encryption operation on the third password using the second key to generate an encrypted password based at least in part on the encryption scheme. In some examples, the transmission component 650 may be configured as or otherwise support a means for transmitting the encrypted password to the host device based at least in part on performing the encryption operation.

In some examples, determining whether the valid password is received includes determining whether the valid password is received within a duration of time from determining the power on condition.

In some examples, the password component 640 may be configured as or otherwise support a means for generating a third password based at least in part determining the power on condition. In some examples, the transmission component 650 may be configured as or otherwise support a means for transmitting the third password to a host device based at least in part on generating the third password.

In some examples, generating the third password is based at least in part on generating a random number. In some examples, the third password includes the random number.

In some examples, transmitting the third password is performed during a power on operation of the memory device.

In some examples, transmitting the third password is performed during a power off operation of the memory device.

In some examples, the power component 625 may be configured as or otherwise support a means for initiating a power off operation for the memory device. In some examples, the power component 625 may be configured as or otherwise support a means for determining whether the power off operation is authorized based at least in part on initiating the power off operation. In some examples, the password component 640 may be configured as or otherwise support a means for storing a third password in the memory device based at least in part on determining that the power off operation is authorized. In some examples, the power component 625 may be configured as or otherwise support a means for powering off the memory device based at least in part on storing the third password.

Figure 7:
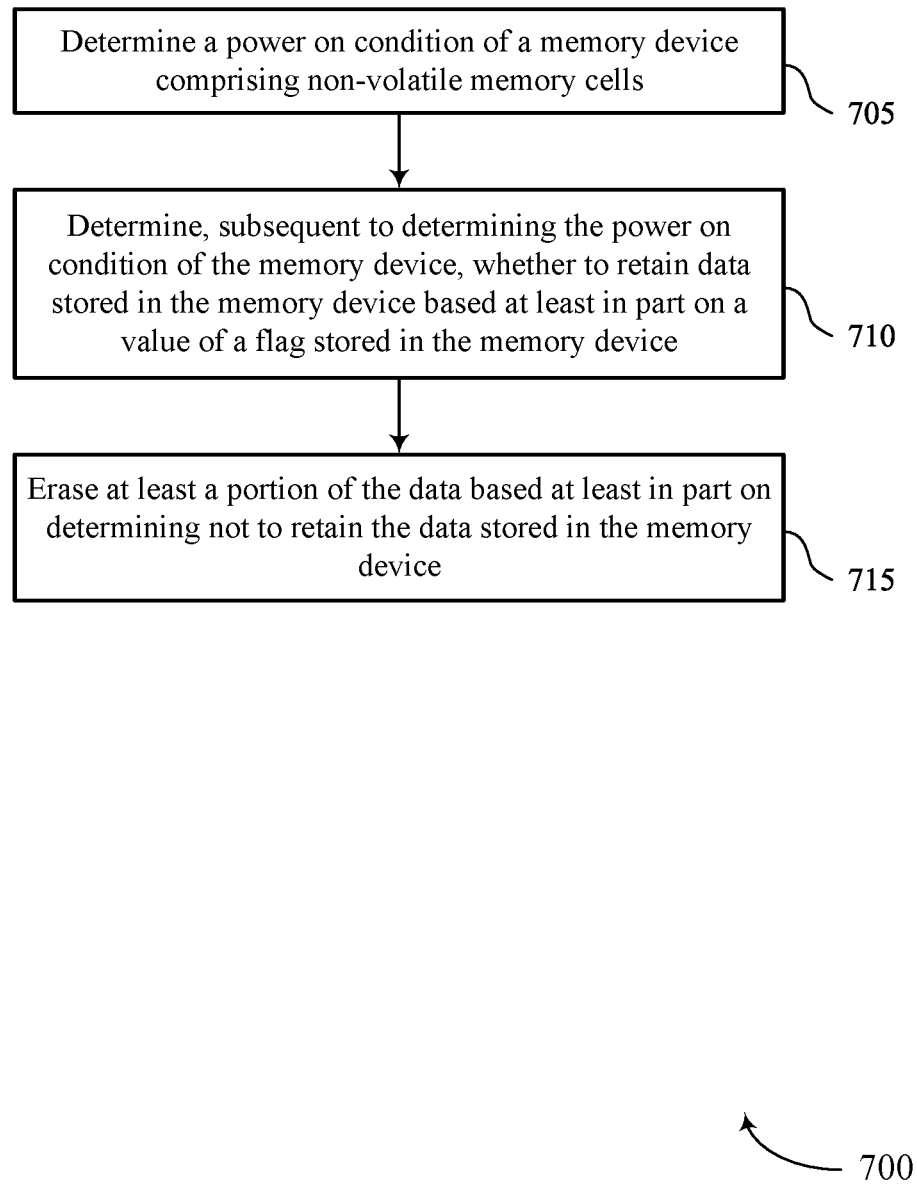
FIGS. 7 and 8 show flowcharts illustrating a method or methods that support techniques for non-volatile data protection in accordance with examples as disclosed herein.

FIG. 7 shows a flowchart illustrating a method 700 that supports techniques for non-volatile data protection in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include determining a power on condition of a memory device including non-volatile memory cells. The operations of 705 may be performed in accordance with examples as disclosed herein. In some examples, aspects of the operations of 705 may be performed by a power component 625 as described with reference to FIG. 6.

At 710, the method may include determining, subsequent to determining the power on condition of the memory device, whether to retain data stored in the memory device based at least in part on a value of a flag stored in the memory device. The operations of 710 may be performed in accordance with examples as disclosed herein. In some examples, aspects of the operations of 710 may be performed by a retention flag component 630 as described with reference to FIG. 6.

At 715, the method may include erasing at least a portion of the data based at least in part on determining not to retain the data stored in the memory device. The operations of 715 may be performed in accordance with examples as disclosed herein. In some examples, aspects of the operations of 715 may be performed by a data erase component 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining a power on condition of a memory device including non-volatile memory cells: determining, subsequent to determining the power on condition of the memory device, whether to retain data stored in the memory device based at least in part on a value of a flag stored in the memory device: and erasing at least a portion of the data based at least in part on determining not to retain the data stored in the memory device.

Aspect 2: The method, apparatus, or non-transitory computer-readable medium of aspect 1, further including operations, features, circuitry, logic, means, or instructions, or any combination thereof for initiating a power off operation for the memory device and determining whether the power off operation is authorized based at least in part on initiating the power off operation.

Aspect 3: The method, apparatus, or non-transitory computer-readable medium of aspect 2, further including operations, features, circuitry, logic, means, or instructions, or any combination thereof for setting, prior to completion of the power off operation, the value of the flag stored in the memory device to indicate to not retain second data stored in the memory device based at least in part on determining that the power off operation is not associated with an authorized command to power down.

Aspect 4: The method, apparatus, or non-transitory computer-readable medium of any of aspects 2 through 3, further including operations, features, circuitry, logic, means, or instructions, or any combination thereof for setting, prior to completion of the power off operation, the value of the flag stored in the memory device to indicate to retain second data stored in the memory device based at least in part on determining that the power off operation is associated with an authorized command to power down.

Aspect 5: The method, apparatus, or non-transitory computer-readable medium of any of aspects 2 through 4, further including operations, features, circuitry, logic, means, or instructions, or any combination thereof for receiving, from a host device, a command to power down the memory device and determining whether the host device is authorized to send the command, where determining whether the power off operation is authorized is based at least in part on determining whether the host device is authorized to send the command.

Aspect 6: The method, apparatus, or non-transitory computer-readable medium of any of aspects 1 through 5, further including operations, features, circuitry, logic, means, or instructions, or any combination thereof for setting the value of the flag stored in the memory device to indicate not to retain second data stored in the memory device based at least in part on powering on the memory device.

Aspect 7: The method, apparatus, or non-transitory computer-readable medium of aspect 6 where setting the value of the flag stored in the memory device to indicate not to retain the second data is performed as part of a power on operation for the memory device.

Aspect 8: The method, apparatus, or non-transitory computer-readable medium of any of aspects 1 through 7, further including operations, features, circuitry, logic, means, or instructions, or any combination thereof for receiving, from a host device, a first password associated with the data based at least in part on determining the power on condition and determining whether the first password matches a second password associated with authorized access to the data based at least in part on receiving the first password, where erasing at least a portion of the data is based at least in part on determining that the first password does not match the second password.

Figure 8:
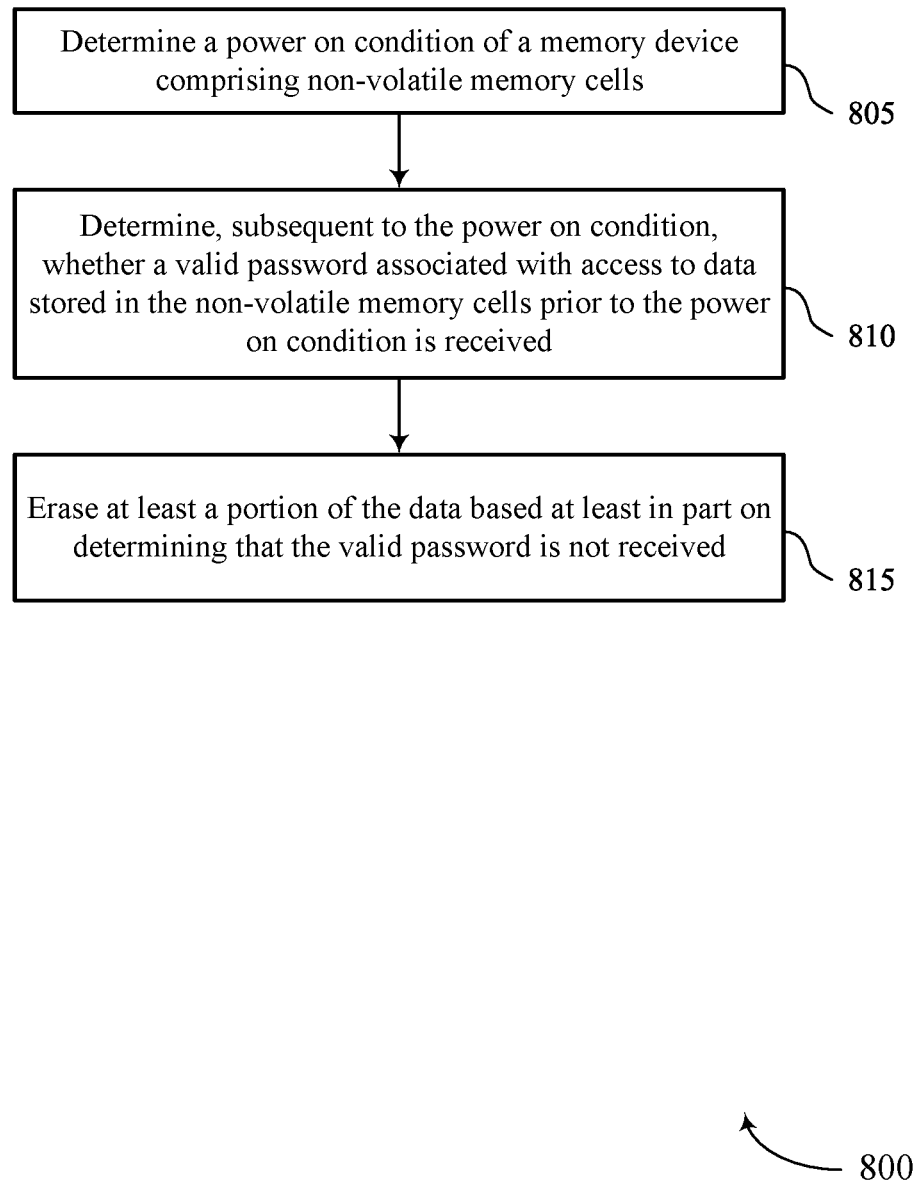

FIG. 8 shows a flowchart illustrating a method 800 that supports techniques for non-volatile data protection in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include determining a power on condition of a memory device including non-volatile memory cells. The operations of 805 may be performed in accordance with examples as disclosed herein. In some examples, aspects of the operations of 805 may be performed by a power component 625 as described with reference to FIG. 6.

At 810, the method may include determining, subsequent to the power on condition, whether a valid password associated with access to data stored in the non-volatile memory cells prior to the power on condition is received. The operations of 810 may be performed in accordance with examples as disclosed herein. In some examples, aspects of the operations of 810 may be performed by a password component 640 as described with reference to FIG. 6.

At 815, the method may include erasing at least a portion of the data based at least in part on determining that the valid password is not received. The operations of 815 may be performed in accordance with examples as disclosed herein. In some examples, aspects of the operations of 815 may be performed by a data erase component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 9: A method, apparatus, or non-transitory computer-readable medium including operations, features, circuitry, logic, means, or instructions, or any combination thereof for determining a power on condition of a memory device including non-volatile memory cells: determining, subsequent to the power on condition, whether a valid password associated with access to data stored in the non-volatile memory cells prior to the power on condition is received: and erasing at least a portion of the data based at least in part on determining that the valid password is not received.

Aspect 10: The method, apparatus, or non-transitory computer-readable medium of aspect 9, further including operations, features, circuitry, logic, means, or instructions, or any combination thereof for receiving, from a host device, a first password subsequent to determining the power on condition and determining whether the first password matches the valid password based at least in part on receiving the first password, where erasing at least the portion of the data is based at least in part on determining that the first password does not match the valid password.

Aspect 11: The method, apparatus, or non-transitory computer-readable medium of aspect 10, further including operations, features, circuitry, logic, means, or instructions, or any combination thereof for receiving, from the host device, a first key and a second key, where the first key and the second key are associated with an encryption scheme between the host device and the memory device and storing the first key and the second key in the memory device.

Aspect 12: The method, apparatus, or non-transitory computer-readable medium of aspect 11, further including operations, features, circuitry, logic, means, or instructions, or any combination thereof for performing a decryption operation on the first password using the first key to generate a decrypted password based at least in part on the encryption scheme, where determining whether the first password matches the valid password is based at least in part on determining whether the decrypted password matches the valid password.

Aspect 13: The method, apparatus, or non-transitory computer-readable medium of any of aspects 11 through 12, further including operations, features, circuitry, logic, means, or instructions, or any combination thereof for generating a third password based at least in part determining the power on condition: performing an encryption operation on the third password using the second key to generate an encrypted password based at least in part on the encryption scheme: and transmitting the encrypted password to the host device based at least in part on performing the encryption operation.

Aspect 14: The method, apparatus, or non-transitory computer-readable medium of any of aspects 9 through 13 where determining whether the valid password is received includes determining whether the valid password is received within a duration of time from determining the power on condition.

Aspect 15: The method, apparatus, or non-transitory computer-readable medium of any of aspects 9 through 14, further including operations, features, circuitry, logic, means, or instructions, or any combination thereof for generating a third password based at least in part determining the power on condition and transmitting the third password to a host device based at least in part on generating the third password.

Aspect 16: The method, apparatus, or non-transitory computer-readable medium of aspect 15 where generating the third password is based at least in part on generating a random number and the third password includes the random number.

Aspect 17: The method, apparatus, or non-transitory computer-readable medium of any of aspects 15 through 16 where transmitting the third password is performed during a power on operation of the memory device.

Aspect 18: The method, apparatus, or non-transitory computer-readable medium of any of aspects 15 through 17 where transmitting the third password is performed during a power off operation of the memory device.

Aspect 19: The method, apparatus, or non-transitory computer-readable medium of any of aspects 9 through 18, further including operations, features, circuitry, logic, means, or instructions, or any combination thereof for initiating a power off operation for the memory device: determining whether the power off operation is authorized based at least in part on initiating the power off operation: storing a third password in the memory device based at least in part on determining that the power off operation is authorized: and powering off the memory device based at least in part on storing the third password.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   determining a power on condition of a memory device comprising non-volatile memory cells;
   determining, subsequent to determining the power on condition of the memory device, whether to retain data stored in the memory device based at least in part on a value of a flag stored in the memory device and based at least in part on whether a valid password corresponding to a transmitted password and associated with access to the data stored in the non-volatile memory cells prior to the power on condition is received;
   erasing at least a portion of the data based at least in part on determining not to retain the data stored in the memory device;
   receiving, from a host device, one or more commands associated with second data after erasing the at least the portion of the data; and
   performing the one or more commands associated with the second data based at least in part on receiving the one or more commands.

2. The method of claim 1, further comprising:
initiating a power off operation for the memory device; and
determining whether the power off operation is authorized based at least in part on initiating the power off operation.

3. The method of claim 2, further comprising:
setting, prior to completion of the power off operation, the value of the flag stored in the memory device to indicate to not retain second data stored in the memory device based at least in part on determining that the power off operation is not associated with an authorized command to power down.

4. The method of claim 2, further comprising:
setting, prior to completion of the power off operation, the value of the flag stored in the memory device to indicate to retain second data stored in the memory device based at least in part on determining that the power off operation is associated with an authorized command to power down.

5. The method of claim 2, further comprising:
receiving, from the host device, a command to power down the memory device; and
determining whether the host device is authorized to send the command, wherein determining whether the power off operation is authorized is based at least in part on determining whether the host device is authorized to send the command.

6. The method of claim 1, further comprising:
setting the value of the flag stored in the memory device to indicate not to retain second data stored in the memory device based at least in part on powering on the memory device.

7. The method of claim 6, wherein setting the value of the flag stored in the memory device to indicate not to retain the second data is performed as part of a power on operation for the memory device.

8. The method of claim 1, further comprising:
receiving, from the host device, a first password associated with the data based at least in part on determining the power on condition; and
determining whether the first password matches a second password associated with authorized access to the data based at least in part on receiving the first password, wherein erasing at least a portion of the data is based at least in part on determining that the first password does not match the second password.

9. A method, comprising:
transmitting a password from a memory device to a host device;
initiating a power off operation of the memory device after transmitting the password;
determining a power on condition of a memory device comprising non-volatile memory cells;
determining, subsequent to the power on condition, whether a valid password corresponding to the transmitted password and associated with access to data stored in the non-volatile memory cells prior to the power on condition is received; and
erasing at least a portion of the data based at least in part on determining that the valid password is not received.

10. The method of claim 9, further comprising:
receiving, from the host device, a second password subsequent to determining the power on condition; and
determining whether the second password matches the valid password based at least in part on receiving the second password, wherein erasing at least the portion of the data is based at least in part on determining that the second password does not match the valid password.

11. The method of claim 10, further comprising:
receiving, from the host device, a first key and a second key, wherein the first key and the second key are associated with an encryption scheme between the host device and the memory device; and
storing the first key and the second key in the memory device.

12. The method of claim 11, further comprising:
performing a decryption operation on the second password using the first key to generate a decrypted password based at least in part on the encryption scheme, wherein determining whether the second password matches the valid password is based at least in part on determining whether the decrypted password matches the valid password.

13. The method of claim 11, further comprising;
generating a third password based at least in part on determining the power on condition;
performing an encryption operation on the third password using the second key to generate an encrypted password based at least in part on the encryption scheme; and
transmitting the encrypted password to the host device based at least in part on performing the encryption operation.

14. The method of claim 9, wherein determining whether the valid password is received comprises determining whether the valid password is received within a duration of time from determining the power on condition.

15. A method, comprising:
determining a power on condition of a memory device comprising non-volatile memory cells;
determining, subsequent to the power on condition, whether a valid password associated with access to data stored in the non-volatile memory cells prior to the power on condition is received from a host device;
erasing at least a portion of the data based at least in part on determining that the valid password is not received;
generating a third password based at least in part on determining the power on condition; and
transmitting the third password to the host device based at least in part on generating the third password.

16. The method of claim 15, wherein generating the third password is based at least in part on generating a random number, and wherein the third password comprises the random number.

17. The method of claim 15, wherein transmitting the third password is performed during a power on operation of the memory device.

18. The method of claim 15, wherein transmitting the third password is performed during a second power off operation of the memory device.

19. The method of claim 9, further comprising:
initiating a second power off operation for the memory device;
determining whether the second power off operation is authorized based at least in part on initiating the power off operation;
storing a third password in the memory device based at least in part on determining that the second power off operation is authorized; and
powering off the memory device based at least in part on storing the third password.

20. A memory system, comprising:
one or more controllers associated with one or more memory devices comprising non-volatile memory cells and configured to cause the memory system to:
transmit a password from the memory system to a host device;
initiate a power off operation of the memory system after transmitting the password;
determine a power on condition of the one or more memory devices;
determine, subsequent to the power on condition, whether a valid password corresponding to the transmitted password and associated with access to data stored in the non-volatile memory cells prior to the power on condition is received; and
erase at least a portion of the data based at least in part on determining that the valid password is not received.

21. The memory system of claim 20, wherein the one or more controllers are further configured to cause the memory system to:
receive, from the host device, a first password subsequent to determining the power on condition; and
determining whether the first password matches the valid password based at least in part on receiving the first password, wherein erasing at least the portion of the data is based at least in part on determining that the first password does not match the valid password.

22. The memory system of claim 21, wherein the one or more controllers are further configured to cause the memory system to:
receive, from the host device, a first key and a second key, wherein the first key and the second key are associated with encryption scheme between the memory system and the host device; and
store the first key and the second key in the memory system.

23. The memory system of claim 22, wherein the one or more controllers are further configured to cause the memory system to:
perform a decryption operation on the first password using the first key to generate a decrypted password based at least in part on the encryption scheme, wherein determining whether the first password matches the valid password is based at least in part on determining whether the decrypted password matches the valid password.

24. The memory system of claim 22, wherein the one or more controllers are further configured to cause the memory system to:
generate a third password based at least in part on determining the power on condition;
perform an encryption operation on the third password using the second key to generate an encrypted password based at least in part on the encryption scheme; and
transmit the encrypted password to the host device based at least in part on performing the encryption operation.

25. A memory system, comprising:
one or more controllers associated with one or more memory devices comprising non-volatile memory cells and configured to cause the memory system to:
determine a power on condition of the one or more memory devices;
determine, subsequent to the power on condition, whether a valid password associated with access to data stored in the non-volatile memory cells prior to the power on condition is received;
erase at least a portion of the data based at least in part on determining that the valid password is not received;
initiate a power off operation for the memory system;
determine whether the power off operation is authorized based at least in part on initiating the power off operation;
store a third password in the memory system based at least in part on determining that the power off operation is authorized; and
power off the memory system based at least in part on storing the third password.

* * * * *